(12) United States Patent
Mesaed et al.

(10) Patent No.: US 11,592,378 B1
(45) Date of Patent: Feb. 28, 2023

(54) ACHE TUBE LEAK TESTING TOOL

(71) Applicant: Saudi Arabian Oil Company, Dhahran (SA)

(72) Inventors: Ayedh Mesaed, Abqaiq (SA); Gussin F. Alsubaie, Abqaiq (SA); Abdullah Mohammed Alshwish, Al Mubarraz (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/461,385

(22) Filed: Aug. 30, 2021

(51) Int. Cl.
*G01M 3/28* (2006.01)
*G01M 3/02* (2006.01)
*G01N 3/12* (2006.01)

(52) U.S. Cl.
CPC .............. *G01N 3/12* (2013.01); *G01M 3/022* (2013.01); *G01M 3/2846* (2013.01)

(58) Field of Classification Search
CPC .......... G01M 3/02; G01M 3/022; G01M 3/32; G01M 3/227; G01M 3/3227
See application file for complete search history.

(56) References Cited

U.S. PATENT DOCUMENTS

| | | | |
|---|---|---|---|
| 8,261,593 B1 * | 9/2012 | Sanders | G01M 3/106 73/40.5 R |
| 8,974,607 B2 | 3/2015 | Al-Otaibi | |
| 2011/0247786 A1 * | 10/2011 | Dixon | F28G 15/08 165/172 |

* cited by examiner

*Primary Examiner* — Erika J. Villaluna
(74) *Attorney, Agent, or Firm* — Leason Ellis LLP

(57) ABSTRACT

A test apparatus and method for use, in situ, to identify leaks in individual tubes in an air-cooled heat exchanger includes a pressurizing component and a pressure retaining component that are secured in the opposite ends of an individual tube by engagement of a lock member in the threaded opening in the respective adjacent headers from which the access port covers have been removed. A pressurized test liquid, e.g., water, is admitted via the test apparatus pressurizing component to fill the tube by initially venting and then closing a drain valve on the pressure retaining component and controllably increasing the hydrostatic pressure on the tube to a predetermined value and monitoring a gauge in the pressurizing component for any loss of the final test pressure, thereby confirming a leak, after which the tube is drained and sealed to remove it from service.

8 Claims, 1 Drawing Sheet

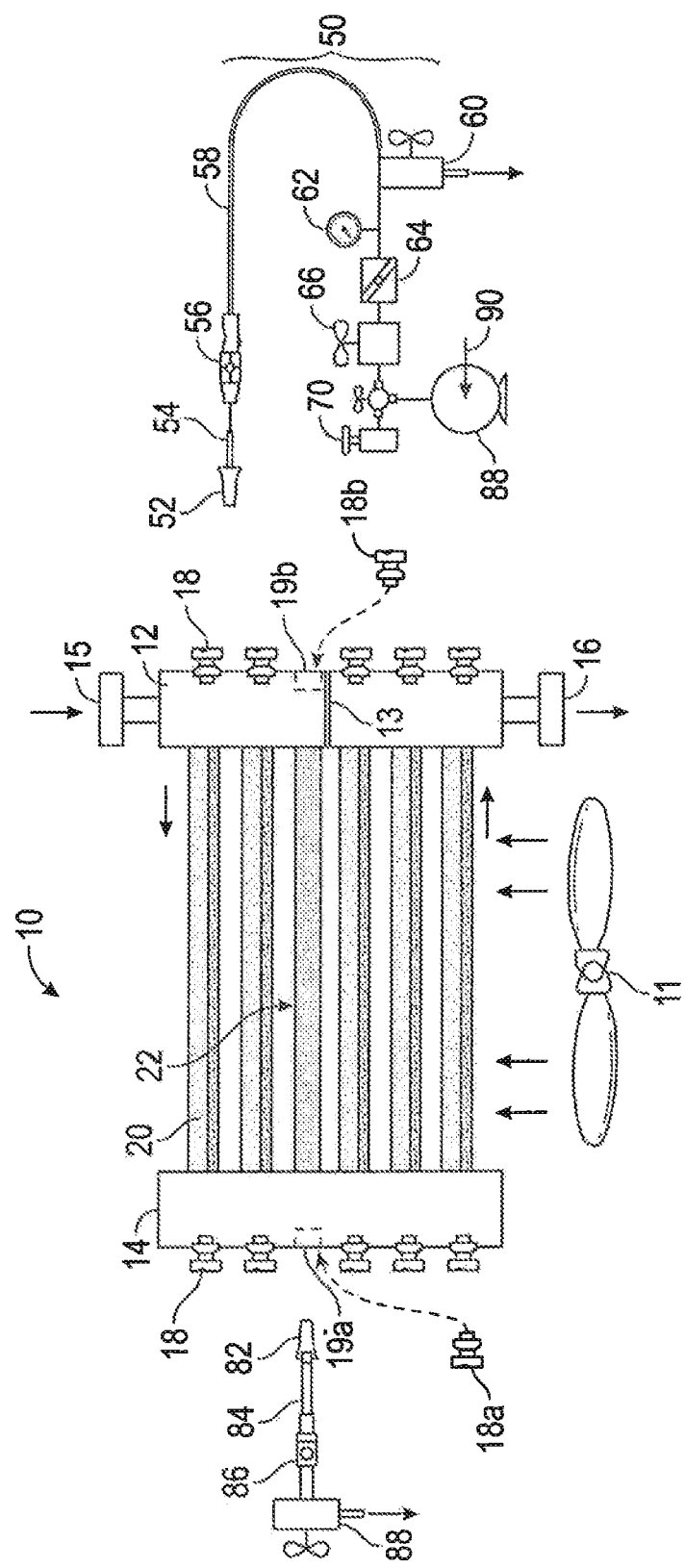

ACHE TUBE LEAK TESTING TOOL

FIELD OF THE INVENTION

This disclosure relates to an apparatus and method for testing the tubes of an air cooled heat exchanger (ACHE) for leaks.

BACKGROUND OF THE INVENTION

Air cooled heat exchangers are comprised of an array of parallel heat exchange tubes that are fitted with fins to increase the efficiency of the heat exchange of the process liquid with an ambient air stream that is passed through the fins by cooling fans that are located below the tube cell, or array. The array can consist of 100 tubes. The ACHE support structure is typically constructed in close proximity to the source of the processing units from which the liquid is passed via piping into the upper portion of the receiving header via an inlet flange, through an upper set of the tubes into a return header at the opposite end of the apparatus, and passed through a lower set of tubes to the lower portion of the receiving header and discharged via an outlet flange.

The exterior of the finned tubes are exposed to local weather conditions and often to wide variations in ambient temperatures, including that of the process fluids which pass through the apparatus for cooling. The internal surface of the tubes is likewise subjected to a variety of process fluids which can include both liquids and vapors, some of which may adversely affect the metallurgy of the interior of the tubes. These adverse effects can eventually lead to leaks where the tubes join the headers, or anywhere along the interior surface of the individual tubes.

Because of the size of the ACHE and the close proximity of the tubes to each other forming the array, the identification of the source of any given leak can be difficult for maintenance personnel to determine. Typically, the leak will appear in the area below the tube array, although forced air flow created by the cooling fan(s) can have the effect of dispersing small amounts of leaking liquids, and/or causing them to flow along one or more of the exterior surfaces of the finned tubes to appear below at a location that is remote from the actual source. Because of potential hazards for the local environment associated with a process liquid spill, it is important to be able to identify the source of the leak(s) and remove damaged tube(s) from service promptly to avoid the accumulation of process liquids on the ground in the vicinity of the ACHE.

One prior art method for testing for leaks in the tubes of an ACHE includes introducing a high pressure liquid into the system under static conditions for the purpose of maximizing the flow rate of the test fluid through any damaged sections of the tube and/or leaking joints. Such hyperpressure testing can lead to damage of other components of the ACHE which can result in increase maintenance costs for repairs that might not otherwise have been required until after some prolonged period of service of the unit.

It would be desirable to have an improved method of testing the ACHE tubes for leaks that would not risk damaging other components in the ACHE, or accelerating the possible failure of parts which might otherwise have an extended useful service life.

BRIEF DESCRIPTION OF THE INVENTION

The above problems are avoided and other benefits and advantages are achieved by employing the testing apparatus and method of the present invention which permits each of the tubes of the ACHE to be individually tested without risk of damaging other components. During the testing of an individual tube, any failure will be apparent and a water leak may be observed visually and/or verified by a drop in the pressure of the hydrostatic testing liquid which will be shown by the loss of pressure on a pressure gauge which constitutes an integral part of the test apparatus. As will be explained in more detail below, upon completion of the test of an individual tube, any liquid present is preferably drained and disposed of appropriately.

In a preferred embodiment, the test liquid is water, which can include process water that is available at the site of the ACHE. The testing tool or kit of the present disclosure includes two principal components, each of which is adapted and configured to be inserted and secured in pressure- and fluid-tight relation at the opposing ends of an individual heat exchange tube of the ACHE that is to be tested. The first is referred to as the "pressurizing component" and includes an isolation and control valve, a check valve, a drain valve, a pressure gauge, and a tube lock member assembly that includes a threaded tube lock secured by an extension tube to a seal plug. The seal plug is a modified tapered tube plug that has been drilled along its center axis to securely receive the extension tube in fluid-tight relation for passage of the test liquid.

A source of pressurized water and means for delivering the pressurized water to the inlet of the isolation valve is preferably provided from an existing source in the vicinity of the ACHE. A hand pump can optionally be included to advantageously permit the pressure on the test apparatus to be gradually increased manually at the upper end of the testing pressure range.

The second element of the leak testing apparatus is referred to as the "pressure retaining component" and includes a seal plug, a tube lock and a vent device.

It will be understood that the various elements of both the pressurizing component and the pressure retaining component, respectively, are joined by appropriate fittings in fluid communication by rigid and/or flexible lengths of conduit that are selected to withstand the maximum hydrostatic pressure to which the system could foreseeably be exposed. It will also be understood that the various valves, controls and gauges can be manually operated or automated via computer-controlled means that are known in the art.

Referring in more detail to the function of the devices identified above, the isolation or control valve serves the purpose of opening the flow channel of the first component to the pressurized flow into the ACHE tube being tested and closing the conduit at the appropriate time. A gate valve is preferably employed as the control valve because it provides the operator with the ability to manually adjust and gradually reduce the flow rate as the pressure in the system approaches the predetermined maximum test pressure. Other types of valves, e.g., a ball valve can be used for this purpose. The check valve serves the customary purpose of preventing the reversal of the flow during the test. The drain valve is employed to reduce the pressure and drain the test liquid at the end of the test. The pressure gauge serves the customary purpose of marking the maximum pressure to be applied by the test liquid and also to reveal the presence of leaks in the tube as evidenced by a reduction in the gauge pressure value which is visually and/or electronically monitored during the test.

With respect to the devices comprising the pressure retaining component, the seal plug functions in conjunction with the extension tube and the threaded lock member to seal the end of the tube opposite the first component. The tube lock serves to maintain the seal plug in place by being screwed into a mating threaded opening in the access ports in the ACHE headers opposite the ends of the tube being tested during the hydrotest procedure. The combination vent and drain valve is initially opened to release the air pressure as the tube is filled then closed for the test. It is eventually opened to facilitate the draining of the test liquid from the tube.

After a test has been completed and any leaks identified in a particular tube, the apparatus is removed by unscrewing the locking members and taper plugs are inserted into the open ends to seal the defective tube and isolate it from the process liquid.

In the practice of the test method of the present disclosure, the ACH E is shut down, drained and blinded. The cooling fans are turned off. The access port covers at either end of the tube or tubes to be tested are removed to permit insertion of the test apparatus.

Beginning with the pressure retaining component of the test apparatus, a threaded lock member assembly that includes an extension tube attached to the seal plug is screwed into the open port to securely position the seal plug in the end of the tube to provide a pressure-tight seal. The lock member maintains the seal plug securely in position during the pressure test. The vent/drain valve on the pressure retaining component is initially open to discharge air and the test liquid until the tube is completely filled with the test liquid. The drain valve is then closed to maintain the pressurized test liquid in the tube being tested.

For installation of the pressurizing component at the other end of the tube, the seal plug is similarly secured in position by the lock member which is in fluid communication with a flexible delivery tube or other delivery conduit for introducing the pressurized test liquid from a pump via the intermediate isolation/control valve. A pressure gauge is operably positioned on the delivery tube. When all of the elements are securely positioned, the control valve is opened and the pressurized test liquid is admitted to the tube and passes through the drain valve of the pressure retaining component until the tube has been completely filled with the test liquid after which the drain valve is closed. When the pressure gauge approaches the predetermined test pressure, the control valve is slowly closed until the final test pressure is reached, after which the control valve is closed to stop the flow. The pressure gauge is monitored to determine if there is a drop in pressure, which would indicate a leak in the tube. The test system can include an optional manually operated hand or small motor-driven pump to more closely control the final test pressure.

In the event that a leak is detected, both drain valves are opened to reduce the pressure, after which the apparatus is removed from the respective access ports. The ends of the damaged tube are plugged to take the tube out of service.

Following completion of the final test, all of the test liquid is drained and the ACHE is purged before being returned to service. The ACHE will be replaced when a predetermined number of tubes have been plugged.

As will be understood from the above description, this present apparatus provides the maintenance crew with an improved system and method for testing each tube in the ACHE individually and, upon observing a pressure drop on the fixed pressure gauge, the leaking tube can be taken out of service for eventual repair or replacement, even if there is no severe damage and the leak cannot readily be seen externally. The principal benefits are the ease of identifying and confirming which tube is leaking so that it can be taken out of service and thereby eliminate a potential environmental hazard. The method also avoids damaging other components and tubes in the ACHE.

BRIEF DESCRIPTION OF THE DRAWINGS

The method and apparatus of the present disclosure will be described in more detail below and with reference to the attached FIGURE which schematically illustrates the relevant portion of an ACHE with the apparatus positioned for placement in the opposite ends of a heat exchange tube in preparation for a hydrostatic pressure test.

DETAILED DESCRIPTION OF THE INVENTION

Referring to the FIGURE, the ACHE tube leak testing apparatus and method will be described in conjunction with the schematic representation of a typical ACHE (10). It is comprised of an array of heat exchange tubes (20) which extend between receiving header (12) and return header (14). The header (12) has an interior dividing baffle wall (13) that directs the incoming fluid stream from inlet flange (15) to the upper set of tubes in the array which then passes the liquid to the return header (14) from which it returns via the lower set of tubes to the lower portion of the header (12) below the dividing wall (13) to exit the ACHE via the discharge flange (16). As schematically illustrated, heat exchange tube (22) is shown with a leak of the process liquid.

The exterior end walls of the receiving and return headers are provided with threaded access ports (19a, 19b) that are coaxial with the heat exchange tubes (20) that extend from the opposite header. During operations, these ports are sealed with threaded access port covers (18a, 18b) that can be removed for inspection, repair and/or removal of the corresponding tube. It will be understood that in order to access the ends of the individual heat exchange tubes, it will be necessary to open corresponding access ports on the respective headers. As schematically illustrated in the FIGURE, the access port covers (18a, 18b) have been removed to provide access to the tube (22).

Also shown is the cooling fan (11) positioned below the array of tubes in the ACHE. It will be understood that during shutdown for inspection, testing and maintenance, the cooling fan is not operated.

In order to initiate a pressure test, the pressurizing component (50) is positioned for insertion of the seal plug (52) into the open access port (19b) by applying a lateral force to the rigid extension tube (54) which is of sufficient length to project from the exterior wall of the header (12). The threaded lock member (56) attached to the distal end of the extension tube (20) is in fluid communication with flexible tubing (58), the distal end of which is connected to drain valve (60) which for the purpose of the pressure test is closed.

With continuing reference to the FIGURE, the opposite end of tube (22) is also fitted with a seal plug (82) which is secured in place in the open end of the heat exchange tube (22) via extension tube (84) in fluid communication with lock member (86) and terminates in vent/drain valve (60) that is initially open to permit the filling of the tube (22) and then closed during the test, and subsequently opened when the test is completed to facilitate drainage of the test liquid from the heat exchange tube (22).

As schematically illustrated in the FIGURE, a source of pressurized test liquid (90), which as noted above is preferably water, enters the test system via optional pump (88) and is passed via control valve (66) through check valve (64) via the conduit (58) to pass into the tube (22) via the tube lock member (56), extension tube (54) and seal plug (52). A stationary pressure gauge (62) is operably positioned in fluid communication with the conduit upstream of the check valve (64). A drain valve (60) is located upstream of check valve (64) and remains in the closed position until the test is completed.

In an embodiment, the test system can include a hand pump (70) and/or manually controlled electric micro-pump for the purpose of gradually increasing the pressure on the interior of the heal exchange tube being tested after the control valve (66) has been closed to discontinue the flow from the pump (68).

Following identification and confirmation of the leak, the drain valves (60) and (88) are opened to drain the test liquid from the tube (22).

After the test apparatus is removed from the opposite ends of the tubes, taper plugs are used to seal the ends of the damaged tube. Testing of other tubes in the array can continue and/or the ACHE can be returned to service, if appropriate. When a predetermined number of tubes have been plugged, the ACHE will be taken out of service and a replacement ACHE installed.

It will be understood from the above description of the testing tool apparatus and its method of use that even relatively small leaks in ACHE tubes can be rapidly detected while at the same time providing a safer environment for the maintenance crew and other plant personnel working in the area. By testing each tube individually, a highly accurate testing process is provided and non-defective tubes are not subjected to unexpected pressures as is the case with the methods of the prior art. The parts comprising the test apparatus are conventional, off-the-shelf and relatively inexpensive. The test can be set up and conducted by maintenance personnel with minimal training requirements and undertaken on as-needed and focused basis.

The invention claimed is:

1. A method for the controlled in situ hydrostatic testing of a tube in an air cooled heat exchanger (ACHE) comprising the steps of:
   a. providing a pressurizing component comprising:
      i. an isolation valve in fluid communication with a source of pressurized testing liquid,
      ii. a check valve,
      iii. a drain valve,
      iv. a pressure gauge, and
      v. a tube lock member assembly from a seal plug, all of which are in fluid communication;
   b. providing a pressure retaining component comprising:
      i. tube lock member assembly formed from a seal plug secured to an extension tube that is securely joined to a threaded lock member, and
      ii. a manually controlled vent/drain valve, all of which are in fluid communication;
   c. securing the pressurizing component in the open end of a tube to be tested;
   d. securing the pressure retaining component in the opposite end of the open tube;
   e. opening the isolation valve to admit a stream of pressurized test liquid and opening the vent in the pressure retaining component to release air from, and fill the interior of the tube with test fluid, and closing the vent valve when test liquid is emitted;
   f. pressurizing the tube with the test liquid to a predetermined value;
   g. monitoring the pressure gauge and closing the isolation valve when the hydrostatic pressure in the tube reaches the predetermined value;
   h. continuing to monitor the pressure gauge for a predetermined period of time during the hydrostatic test; and
   i. identifying the tube as defective for removal from service based upon a predetermined loss in pressure as indicated by the pressure gauge.

2. The method of claim 1 in which the pressurizing component includes an auxiliary pump in fluid communication with the pressurizing liquid, the method further comprising applying additional pressure by actuation of the auxiliary pump until the test liquid is at the predetermined hydrostatic test pressure.

3. The method of claim 1 in which the test liquid is water.

4. The method of claim 1 which includes opening the drain valve in the pressurizing component and the drain valve in the pressure retaining component to drain the test liquid from the tube.

5. The method of claim 1 which includes the steps of:
   a. removing the pressurizing component and the pressure retaining component from the end of the tube; and
   b. inserting taper plugs to seal the open ends of the defective tube, thereby isolating it from the process liquid when the ACHE is returned to service.

6. The method of claim 1 which includes the preparatory steps of:
   a. opening an access port in headers of the ACHE opposite the ends of the tube to be tested by removing threaded closures from the ports; and
   b. screwing the threaded lock member assembly that includes an extension tube attached to the seal plug into the threaded port to securely position the seal plug in the end of the tube to form a pressure-tight seal with the tube.

7. The method of claim 6 which includes securing the seal plug of the pressure retaining component into the opposite end of the open tube by screwing the lock member into the threaded port in fluid-tight relation with the extension tube.

8. An apparatus for the in situ pressure testing a tube of an air cooled heat exchanger (ACHE) that comprises:
   a. a pressurizing component for introducing a pressurized hydrostatic testing liquid into an open first end of a tube to be tested, the pressurizing component comprising:
      i. a seal plug for engaging in fluid tight relation the open end of a tube,
      ii. an extension tube secured to the seal plug,
      iii. a tube lock secured to the extension tube,
      iv. a flexible conduit secured to the extension tube at one end and to a drain valve at the opposite end, the drain valve being in fluid communication with a pressure gauge and check valve,
      v. an isolation valve for controlling the flow of a test liquid to the check valve, from a source of pressurized test liquid;
   b. a pressure retaining component that is secured in fluid-tight relation to the opposite end of the tube, the pressurizing component comprising in fluid communication, the pressure retaining component comprising:
      i. a seal plug configured and dimensioned to engage the open end of the tube in fluid tight relation,
      ii. an extension tube secured to the seal plug,
      iii. a tube lock member that is configured and dimensioned to be secured in an open threaded port of a header opposite the end of the tube to be tested, and iv. a vent/drain valve secured to the open end of the extension tube.

\* \* \* \* \*